United States Patent [19]

Eads

[11] 4,121,816
[45] Oct. 24, 1978

[54] WORKPIECE HOLDER FOR HIGH VOLUME MANUFACTURING OPERATIONS

[76] Inventor: Donald Everett Eads, P.O. Box 690, Cupertino, Calif. 95014

[21] Appl. No.: 802,028

[22] Filed: May 31, 1977

[51] Int. Cl.² .............................................. B23Q 3/00
[52] U.S. Cl. .................................................. 269/296
[58] Field of Search ............................... 269/296–299, 269/321 WE, 55–56, 118, 321 F, 254 R, 303, 43–44; 211/41; 228/36, 37; 29/760

[56] References Cited

U.S. PATENT DOCUMENTS

| 3,216,580 | 11/1965 | Fricker | 211/41 |
| 3,484,226 | 12/1969 | Golightly | 211/41 |
| 3,679,198 | 7/1972 | Weggeland | 269/43 |
| 3,752,467 | 8/1973 | Stanley | 269/321 F |
| 4,030,717 | 6/1977 | Serlovsky | 269/321 WE |
| 4,032,130 | 6/1977 | Huntley et al. | 269/254 R |

Primary Examiner—Robert C. Watson
Attorney, Agent, or Firm—Willis E. Higgins

[57] ABSTRACT

This workpiece holder has a plurality of workpiece supports vertically disposed with edges configured to support the workpiece facing upward. The workpiece supports are spaced by means of spacers in accordance with a predetermined dimension of the workpiece in order to allow the workpiece to be supported on the edges of the supports. The workpiece holder is especially designed for holding parts in assembly operations for manufacturing semiconductor device packages.

9 Claims, 7 Drawing Figures

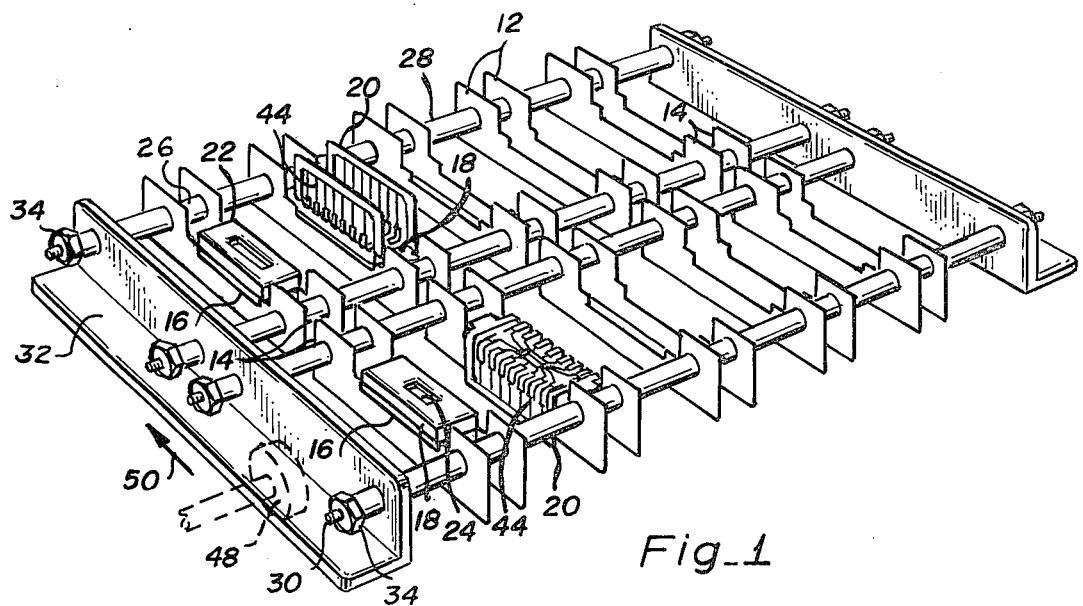
Fig_1
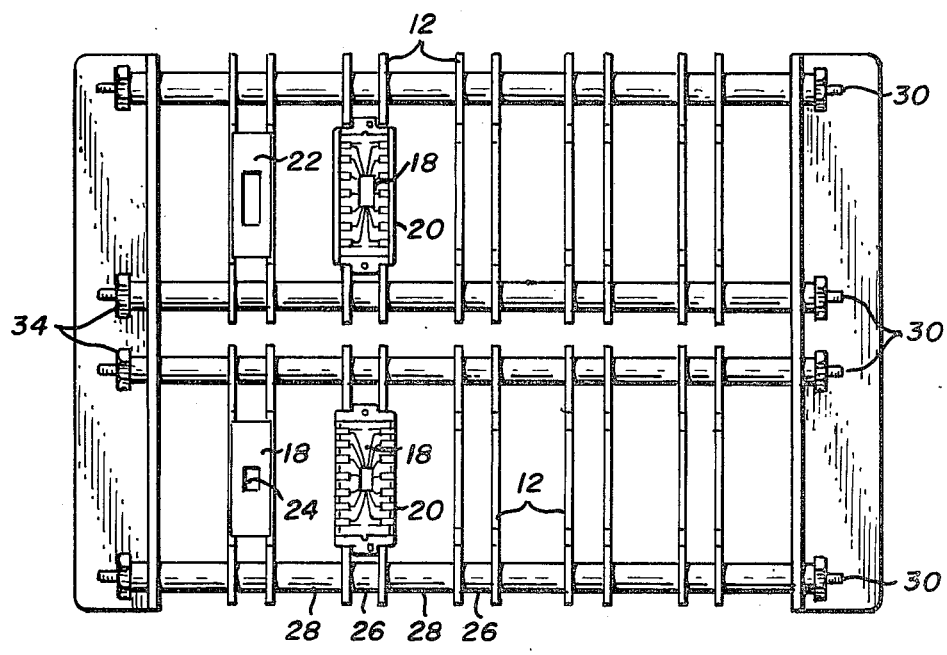
Fig_2

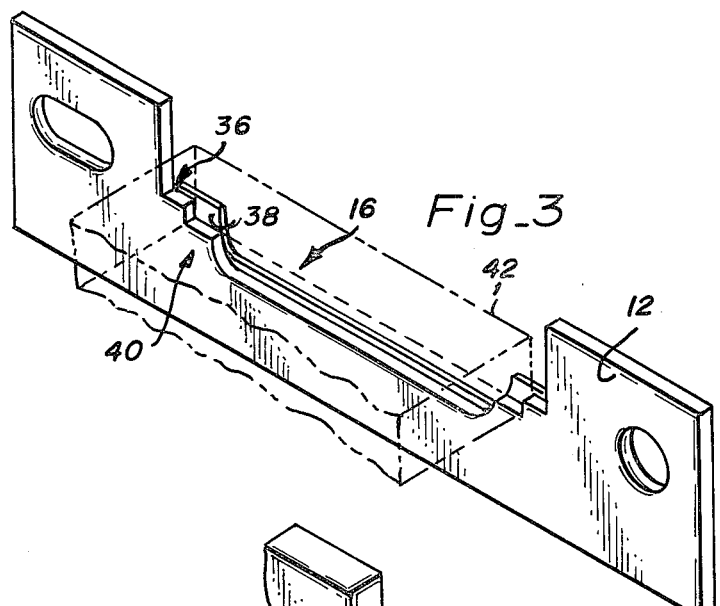
Fig_3
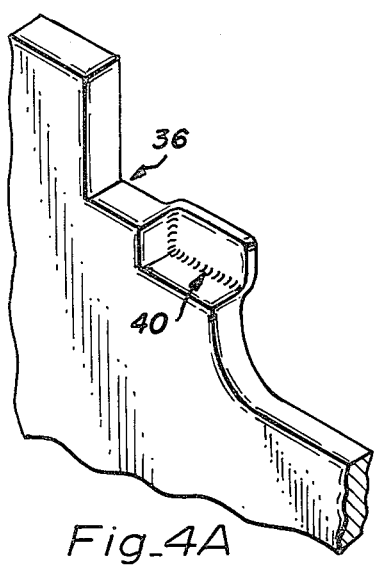
Fig_4A
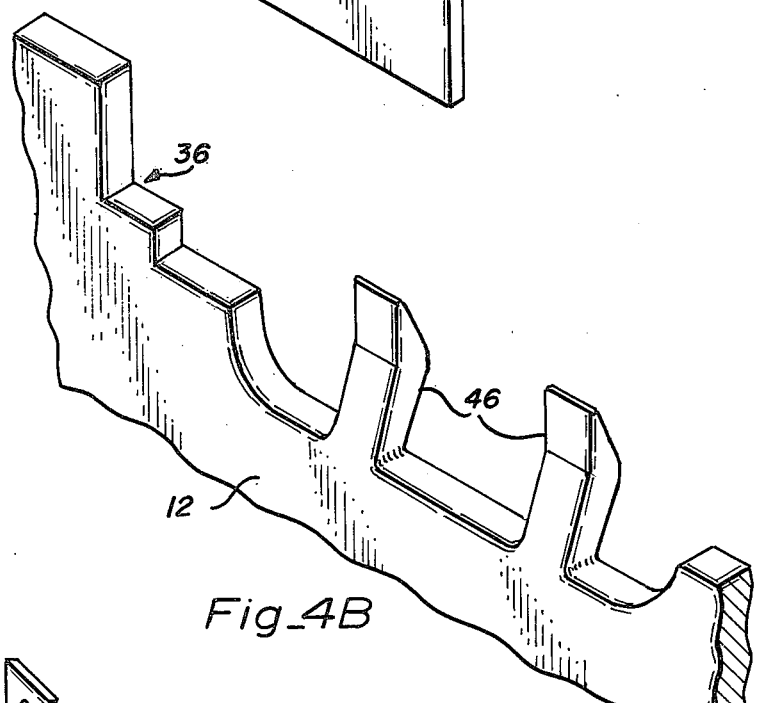
Fig_4B
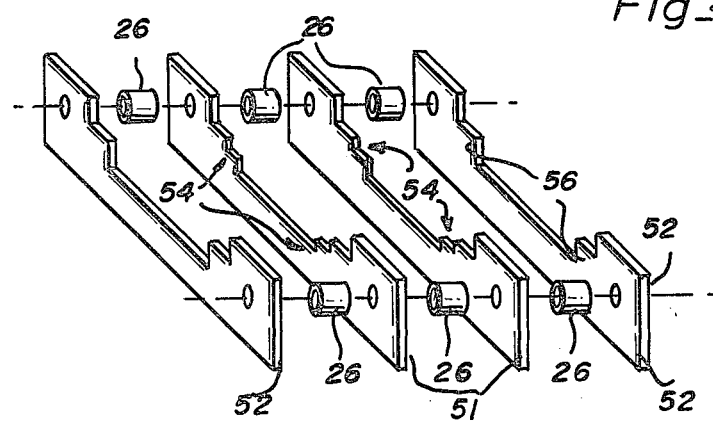
Fig_5
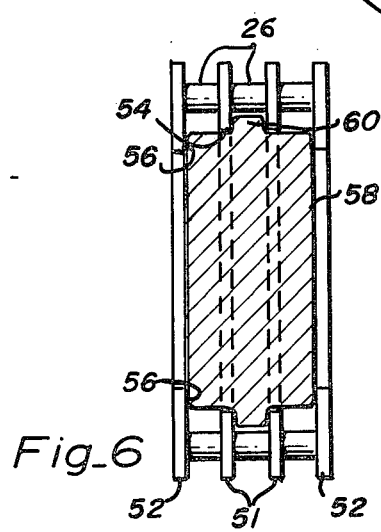
Fig_6

WORKPIECE HOLDER FOR HIGH VOLUME MANUFACTURING OPERATIONS

BACKGROUND OF THE INVENTION

1. Field of the Invention

This invention relates to workpiece holders for presenting a plurality of workpieces to an operation involved in their manufacture. More particularly, it relates to such a workpiece holder especially designed for operations in the assembly of semiconductor device packages. Most especially, it relates to such a workpiece holder designed for semiconductor device package assembly operations carried out on a continuous feed, infrared (IR) and convection heated ovens.

Semiconductor packaging assembly operations are typically characterized by several steps involving heating a part in order to coat it or to bond it to another part. For example, a lead frame may be bonded to a base which will have an integrated circuit chip mounted in it. A cover may then be bonded to the lead frame by melting a glass layer on it. In some cases, glass frits may be applied to one or more of the parts in separate steps prior to bonding. In high volume manufacturing environments for the assembly of such packages, it is a common practice to employ continuous ovens through which the parts are fed on some type of workpiece holder. The parts are typically heated by application of IR energy or convection heat in the ovens. If a bonding operation is being carried out in the oven, it often involves reflow bonding of solder or the heat cure of a potting or casting compound.

In such a continuous oven, workpiece holders for the parts must be capable of supporting the parts in a position to receive IR energy efficiently. They must be built to reasonably tight dimensional tolerances in order to pass through the ovens reliably and support the parts in a precisely predetermined relationship in which they are not free to move before the bonding operation is completed. They must not warp on heating to the temperatures employed in the assembly operations. It would be highly desirable if they could have the capability of holding several different types of standard semiconductor package parts for use with different products employing different parts in their packages.

Depending on the throughput capacity desired, dimensions of semiconductor package assembly equipment of similar design may vary. Consequently, a workpiece holder for semiconductor device package piece parts which is made of easily assembled modular parts would allow dimensional flexibility for use with assembly machines of different dimensions but otherwise similar construction. This also means that workpiece supports of the workpiece holder with overall standard dimensions can be substituted for one another in the holder to give an increased flexibility for using the holder with different types of parts.

2. Description of the Prior Art

Typical prior art workpiece holders used in the above described environment are essentially flat plates of sheet metal with apertures formed to receive the parts in them. Such a holder is inexpensive to fabricate, but not particularly suited for an IR environment due to its large surface area normal to the IR beams in an IR heated oven. Holders presenting a smaller surface area to the IR beams have been fabricated from metal strips by brazing them together, but such fabrication methods are expensive and time consuming. Such prior art workpiece holders have also been limited to holding at most only two particular parts, with a completely different holder design required for each different set of parts to be mounted on the holder. Each different package design requires a different workpiece holder design. This means more complexity is introduced into high volume automated semiconductor package assembly operations.

Considerable effort has been devoted to developing a workpiece holder suited to the demands of the semiconductor package assembly environment. However, a need remains for a workpiece holder ideally suited for semiconductor package assembly operations.

SUMMARY OF THE INVENTION

Accordingly, it is an object of this invention to provide an inexpensive, easily fabricated workpiece holder which presents a relatively small surface area to energy applying means for heating parts being carried by the workpiece holder.

It is another object of the invention to provide a low cost, energy efficient workpiece holder for certain parts which require heating, especially by means of continuous feed infrared (IR) energy beam heated ovens.

It is still another object of the invention to provide an infrared oven workpiece holder which is capable of receiving more than one type of part for heating in the oven.

It is a further object of this invention to provide a workpiece holder of modular construction, so that individual parts of different dimensions may be substituted to give workpiece holders of different overall dimensions with common, standard parts.

The attainment of the foregoing and related objects of the invention may be acheived through use of the novel workpiece holder herein disclosed. A workpiece holder in accordance with this invention has a plurality of essentially flat workpiece supports vertically disposed with edges configured to support a workpiece, such as a semiconductor package part, facing upward. The workpiece supports are spaced by means of spacers to allow the workpiece to rest on the upward facing edges. The spacers are dimensioned in accordance with a predetermined dimension of the workpiece. Preferably, the upward facing edges are grooved or otherwise configured to prevent the workpieces supported by the holder from moving laterally on the holder while passing through an oven or other work station where an assembly operation is carried out. It is also highly advantageous to have a plurality of sets of grooves or other configurations on the upwardly extending support edges of the workpiece holder in order to accomodate a variety of similar workpieces to undergo a given process step.

While the above features of the invention make it especially suited for use in assembling semiconductor device packages in continuous IR ovens, the advantages of this approach should make the workpiece holder suitable for a wide variety of other environments as well. This should be more readily apparent after review of the following more detailed description of the invention, taken together with the drawings, in which:

BRIEF DESCRIPTION OF THE DRAWINGS

FIG. 1 is a perspective view of an embodiment of the invention, showing some of the workpieces that can be supported on it.

FIG. 2 is a top view of the invention to emphasize one of its desirable features.

FIG. 3 is an enlarged view of a portion of the invention to illustrate some of its features more clearly.

FIGS. 4A and 4B show alternative embodiments of the portion of the invention shown in FIG. 3.

FIG. 5 is an exploded perspective view of a portion of another embodiment of the invention, and FIG. 6 is a top view of the embodiment shown in FIG. 5, but assembled.

DETAILED DESCRIPTION OF THE INVENTION

Turning now to the drawings, more particularly to FIG. 1, a workpiece holder in accordance with the invention is shown. The holder has a plurality of vertically disposed workpiece supports 12 having edges 14 facing upward. Recesses 16 are of the proper size to receive semiconductor package parts 18, 20 and 22. Part 18 is the bottom of a completed package. Part 20 is a lead frame used to make contact with an integrated circuit chip which will be mounted in recess 24 in the completed package. Part 22 is the top of the package.

A plurality of spacer elements 26 and 28 position the supports 12 so that the parts 18, 20 and 22 will rest in the recesses 16 without being free to move laterally. Rods 30 extend through the spacer elements 26 and 28 and are threaded on their ends to allow them to be fastened to angles 32 by means of nuts 34.

FIG. 3 shows detail of the recesses 16 which allows the recesses 16 to hold each part 18, 20 and 22 in proper relationship as shown in FIG. 1. Each recess 16 defines a slot 36, and together with metal sheet 38 fastened to support 12, a corner 40. The corners of bottom 18 and top 22 fit into the four corners 40 of adjacent supports 16, as shown by phantom lines 42. The lead frame 20 fits across the slots 36 in superimposed relationship on the top 22 or the bottom 18, depending on which is being bonded to the lead frame 20. It is preferred to notch the lead frame 20 so that it will interlock with slots 36 on adjacent supports 12 to prevent lateral motion of it as well.

FIG. 1 shows how the parts 18, 20 and 22 are arranged on the workpiece holder for carrying out two different operations. On the right hand side, lead frame 20 is positioned over bottom 18 with leads 44 extending downward, in order to bond lead frame 20 to bottom 18 by fusing them together with glass. On the left hand side, the lead frame 20 is shown inverted with its leads 44 extending upward in order to bond the top 22 of the package to the lead frame 20 and the bottom 18. The slots 36 are capable of holding the lead frame 20 in either position. This means that the same workpiece holder can be used for both bonding operations. The workpiece holder can also be used to hold one part alone, such as the bottom 18 or the top 22, for application of coating materials and heat cure of such materials.

In usual use of the workpiece holder, only one bonding or coating operation will be carried out at the same time. This means that one or more parts will be arranged in the same manner in each set of recesses 16. The different arrangements of the parts 18, 20 and 22 as shown simultaneously in FIGS. 1 and 2 are only for the purpose of illustrating the versatility of the workpiece holder. It should further be appreciated that each recess 16 can be configured to provide additional corners and slots for the purpose of accomodating parts having a different length than that shown.

FIGS. 4A and 4B show alternative configurations for the recesses 16 to that shown in FIG. 3. In both FIGS. 4A and 4B, slot 36 is identical to slot 36 in FIG. 3. In FIG. 4A the corner 40 is formed integrally from the support 12 by means of a coining operation. In FIG. 4B, the corner 40 of FIGS. 3 and 4A has been replaced by prongs 46, formed integrally from support 12 by stamping and coining operations. In this embodiment, edges of a bottom 18 or top 22 as shown in FIGS. 1 and 2 butt up against prongs 46 on adjacent supports 12.

In use, one or more parts 18, 20 and 22 are placed in recesses 16 to fill the workpiece holder with parts to be heated simultaneously. The workpiece holder is then fed through an IR oven by means of one or more feed rollers, indicated schematically in phantom at 48 in FIG. 1, in the direction indicated by arrow 50.

For ease of illustration, only a small workpiece holder has been shown in FIGS. 1 and 2. It should be apparent that the same supports 12 and spacers 26 and 28 could be used to make larger workpiece holders having many more supports 12 for use with higher capacity IR ovens.

FIG. 2 shows that the workpiece holder of this invention presents a relatively small surface area to IR beams used to heat the parts 18, 20 and 22 by impinging on their upward facing surfaces. This means that a higher percentage of the IR energy is used to heat the parts 18, 20 and 22 than in the case of prior art workpiece holders presenting a larger surface area to the IR beams.

FIGS. 5 and 6 show another embodiment of the invention, which may be used with wider semiconductor packages than the embodiments shown in FIGS. 1–4B. Workpiece supports 51 are identical in configuration to the workpiece supports 12 in FIGS. 1 and 2, except that they do not have the metal sheet 38 shown in FIG. 3 bonded to them. Thus, the workpiece supports 51 have slots 54 cut through them, and package 58 extends through these slots 54, as shown in FIG. 6. Workpiece supports 52 are disposed on each side of workpiece supports 51. Supports 52 differ from supports 51 in that they do not contain the slot 54. This means that the package 58 butts up against portion 56 of the supports 52, as shown in FIG. 6. Each support 51 or 52 is separated from its adjacent supports by means of spacers 26, to provide a properly dimensioned workpiece support area. Projection 60 of the package 58 extends between workpiece supports 51 as shown in FIG. 6 to prevent motion of the package 58 while in place on the supports 51 and 52. This embodiment shows the flexibility attainable with a workpiece holder in accordance with the invention. Very slight modification of the parts making up the workpiece holder results in the ability to use the holder with a quite different semiconductor package design.

It should now be apparent that an improved workpiece holder capable of acheiving the stated objects of the invention has been provided. This workpiece holder is especially designed to meet the needs of semiconductor device package manufacture involving heating steps in IR or convection ovens. The holder can be used with different parts or with the same parts as they undergo different heating steps involved in the assembly of the package. The holder is easily assembled from standardized parts that can be used to make different size holders.

It should further be apparent to those skilled in the art that various changes in form and details may be made in the design of the holder as shown. It is intended that such changes be included within the spirit and scope of the claims appended hereto.

What is claimed is:

1. A workpiece holder for supporting a plurality of semiconductor device package parts for heating, comprising:

a plurality of essentially flat workpiece supports vertically disposed with edges facing upward, said edges being grooved to form recesses for supporting said package parts, said recesses having a dimension in a first direction corresponding to a dimension of the package parts and preventing the package parts from moving laterally in the first direction and said recesses having a projecting surface displaced to one side of said recesses in a second direction to prevent said package parts from moving in the second direction, said workpiece supports being spaced to allow said package parts to rest within the recesses on the upward facing edges of said workpiece supports, a plurality of spacers for spacing said workpiece supports in accordance with a predetermined dimension in the second direction of said package parts, and means for supporting said flat workpiece supports and said spacers in fixed position relative to each other.

2. The workpiece holder of claim 1 in which the edges of said workpiece supports are grooved to receive at least two different workpieces in assembled relationship to permit the two different workpieces to be bonded to each other.

3. The workpiece holder of claim 2 in which the upwardly facing edges of said workpiece supports contain a recess for receiving each workpiece, the recesses of adjacent workpiece supports serving to confine each workpiece in assembled relationship.

4. The workpiece holder of claim 1 in which said holder is of modular construction, so that individual elements of said holder may be assembled with other individual elements of different dimensions, to give workpiece holders of the same design, but different size.

5. The workpiece holder of claim 2 in which the grooves for supporting said second workpiece extend laterally across said upward facing edge and are dimensioned to confine said second workpiece from moving laterally in one direction, and the spacing between adjacent workpiece supports being dimensioned to confine another workpiece from moving laterally in a second direction.

6. The workpiece holder of claim 1 in which said projecting surface displaced to one side of said recesses is integral to said supports and forms a corner shape with said recess.

7. A workpiece holder for supporting a plurality of semiconductor device package parts for heating, comprising:

a plurality of essentially flat workpiece supports vertically disposed with edges facing upward, said edges being configured to support and confine said package parts from moving by means of an essentially flat member fastened along a surface of said workpiece supports and a groove having a dimension corresponding to a dimension of said package parts in each upward facing edge of said supports, with said flat member extending along one side of the groove, so that said package parts may rest on the upward facing edges of two adjacent workpiece supports and be confined from moving laterally in a first direction by the groove and in a second direction by the essentially flat member, said workpiece supports being spaced to allow said package parts to rest on the upward facing edges of said workpiece supports, a plurality of spacers for spacing said workpiece supports in accordance with a predetermined dimension of said package parts, and means for supporting said flat workpiece supports and said spacers in fixed position relative to each other.

8. A workpiece holder for supporting a plurality of semiconductor package parts for heating, comprising:

a plurality of essentially flat workpiece supports vertically disposed with edges facing upward, said edges being configured by means of recesses to receive such package parts and confine them against lateral motion in a first direction formed in the upward extending edge of said workpiece supports, with at least one prong integrally formed from said workpiece supports extending upward from each said recess and displaced to one side of each said recess in a second direction to confine said package parts from moving laterally in the second direction, said workpiece supports being spaced to allow said package parts to rest within the recesses on the upward facing edges of the workpiece supports, a plurality of spacers for spacing said workpiece supports, in accordance with a predetermined dimension of said package parts, and means for supporting said flat workpiece supports and said spacers in fixed position relative to each other.

9. The workpiece holder of claim 8 in which each said recess has a first portion extending a first distance downward from the upward facing edges of said supports and a second portion extending a second distance less than the first distance downward from the upward facing edges, said at least one prong extending upward from the first portion of each said recess, with at least a portion of said prong being at an angle to displace the prong to one side of said recess at the second downward distance.

* * * * *